United States Patent
Fuller

(10) Patent No.: US 12,489,598 B2
(45) Date of Patent: Dec. 2, 2025

(54) PHASE-BASED LOCK DETECTOR WITH PROGRAMMABLE FREQUENCY OFFSET TOLERANCE

(71) Applicant: Rambus Inc., San Jose, CA (US)

(72) Inventor: Andrew Fuller, Durham, NC (US)

(73) Assignee: Rambus Inc., San Jose, CA (US)

( * ) Notice: Subject to any disclaimer, the term of this patent is extended or adjusted under 35 U.S.C. 154(b) by 72 days.

(21) Appl. No.: 18/507,288

(22) Filed: Nov. 13, 2023

(65) Prior Publication Data

US 2024/0171368 A1 May 23, 2024

Related U.S. Application Data

(60) Provisional application No. 63/384,467, filed on Nov. 21, 2022.

(51) Int. Cl.
*H03D 3/24* (2006.01)
*H04L 7/00* (2006.01)

(52) U.S. Cl.
CPC .................. *H04L 7/0054* (2013.01)

(58) Field of Classification Search
CPC ............................ H04L 7/0054; H03D 13/003
USPC ................................................... 375/373–376
See application file for complete search history.

(56) References Cited

U.S. PATENT DOCUMENTS

| | | | |
|---|---|---|---|
| 5,530,383 A | 6/1996 | May | |
| 6,680,991 B1 | 1/2004 | Gutierrez | |
| 6,859,107 B1 | 2/2005 | Moon et al. | |
| 6,879,195 B2 | 4/2005 | Green et al. | |
| 7,084,681 B2 | 8/2006 | Green et al. | |
| 8,929,500 B2 | 1/2015 | Mukherjee | |
| 8,947,167 B2 | 2/2015 | Kargar et al. | |
| 9,197,396 B1 | 11/2015 | Srinivasa | |
| 10,644,868 B2 | 5/2020 | Manian et al. | |
| 2004/0257118 A1* | 12/2004 | Galloway | H03D 13/003 327/2 |
| 2006/0062341 A1 | 3/2006 | Edmondson et al. | |
| 2022/0182267 A1 | 6/2022 | Wang et al. | |

* cited by examiner

*Primary Examiner* — Phuong Phu

(74) *Attorney, Agent, or Firm* — Silicon Edge Law Group LLP; Arthur J. Behiel

(57) ABSTRACT

A lock-detection circuit detects whether a first clock signal is frequency locked to a second clock signal. A lock-detection scheme that continuously evaluates the lock condition between the clock signals and as programmable frequency-offset tolerances for reporting lock acquisition and loss. A quadrature clock generator produces two periodic signals from the first clock signal. The periodic signals are in quadrature, which is to say they are misaligned with one another by ninety degrees. These quadrature signals are sampled on edges of the second clock signal to produce a sequence of states that exhibit a Gray-code progression if first and second clock signals are locked. Errors in the Gray-code progression indicate whether edges of the first clock signal are early or late with respect to the second clock signal. The lock-detection circuit is adjustable to indicate loss of lock under in dependence upon the temporal spacing of errors.

18 Claims, 2 Drawing Sheets

PHASE-BASED LOCK DETECTOR WITH PROGRAMMABLE FREQUENCY OFFSET TOLERANCE

BACKGROUND

Synchronous digital circuits employ clock signals that periodically transition between high and low states, each transition forming a signal edge. The sequence of periodic edges can be communicated like the beats of a metronome to share timing information among and between circuit elements to coordinate their actions. Clock frequency and timing stability—the timing accuracy of clock edges—are measures of merit. As circuit complexity increases, so too does the difficulty to supplying stable, high-frequency clock signals. Doing so sometimes calls for two clock signals to be compared and their phases—the timing of edges—and frequencies to be matched. For example, a circuit element called a phase-locked loop (PLL) compares the phase difference between a reference clock signal and a feedback clock signal and adjusts the frequency of the feedback clock signal to synchronize the clock signals. The frequency of the feedback clock signal "locks" to the frequency of the reference clock signal.

DETAILED DESCRIPTION

Figure 1:
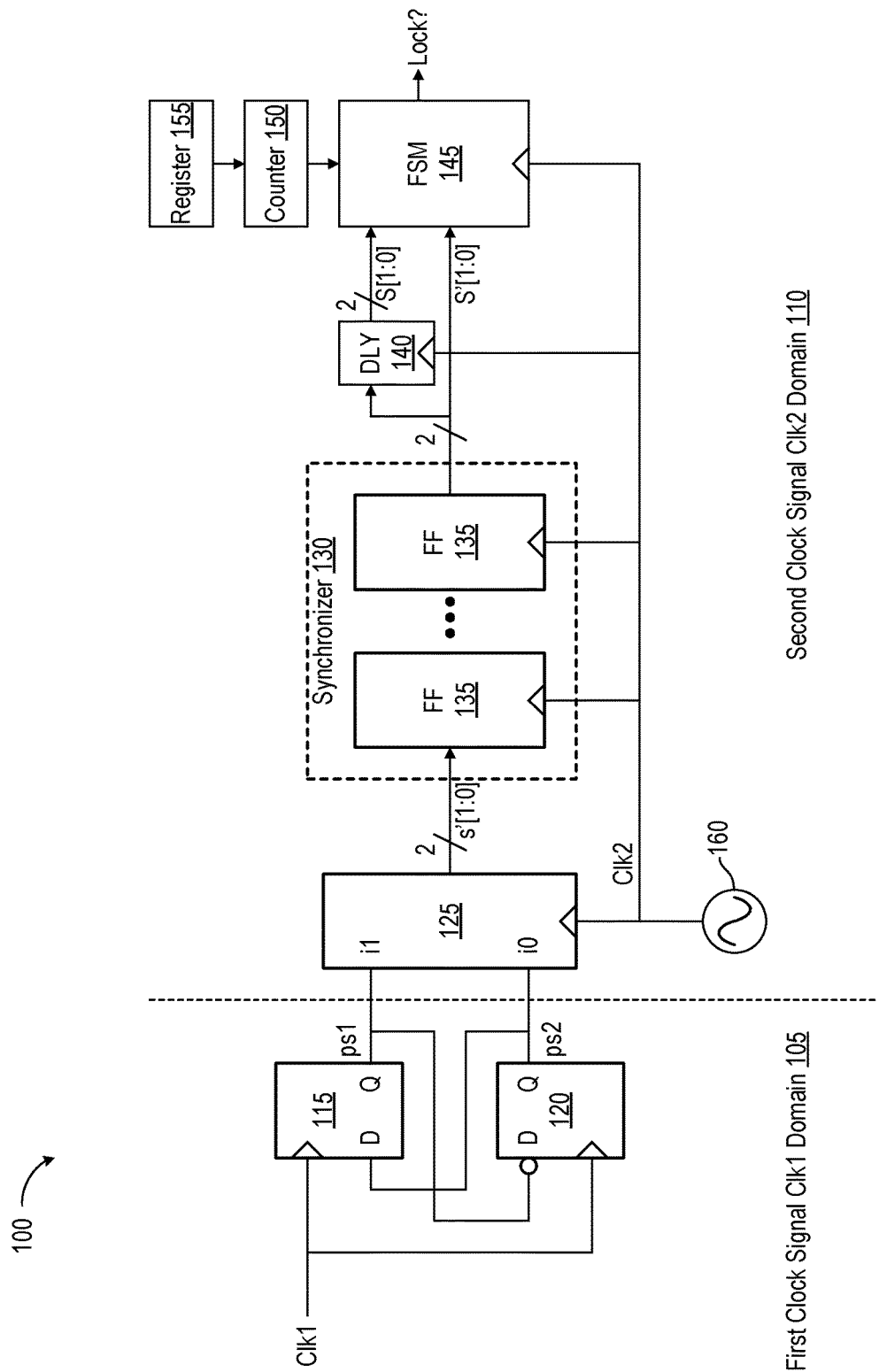
FIG. 1 depicts a lock-detection circuit 100 that detects whether a first clock signal Clk1 is locked to a second clock signal Clk2 that serves as a phase and frequency reference.

FIG. 1 depicts a lock-detection circuit 100 that detects whether a first clock signal Clk1 is locked to a second clock signal Clk2 that serves as a phase and frequency reference. Circuit 100 is divided into two clock domains 105 and 110 in which the constituent circuit elements are respectively timed to first and second clock signals Clk1 and Clk2. Circuit 100 supports a lock-detection scheme that continuously evaluates the lock condition between the clock signals for fast and accurate reporting of lock acquisition and loss. Circuit 100 can be programmed to allow for different frequency-offset tolerances for reporting lock acquisition and loss.

Clock domain 105 includes a pair of cross-coupled flip-flops 115 and 120, synchronous elements that together form a quadrature clock generator that issues periodic signals ps1 and ps2 that are both phase-dependent upon clock signal Clk1 and are in quadrature, which is to say they are phase offset from one another by ninety degrees. Different numbers and phase offsets can be used in other embodiments.

Clock domain 110 includes a di-bit sampler 125, a brute-force synchronizer 130 with a series of N flip-flops 135, a delay element 140, a finite state machine (FSM) 145, a counter 150, a register 155, and a clock source 160. Di-bit sampler 125 samples both periodic signals ps1 and ps2 on rising edges of clock signal Clk2 to produce a sequence of two-bit states s'[1:0], each state including concurrent samples of the first and second periodic signals ps1 and ps2.

Sampling periodic signals ps1 and ps2 on edges of clock signal Clk2 can introduce metastable states. Should an edge of clock signal Clk2 occur during a signal transition of one of signals ps1 and ps2, for example, the resulting sample can represent a metastable state between the binary values of one and zero. Flip-flops 135 of synchronizer 130 force such metastable samples into a stable state, the more flip-flops the more corrective the forced state.

Synchronizer 130 conveys a stabilized sequence of states S'[1:0] to delay element 140 and FSM 145. Delay element 140 delays this sequence by one clock cycle and presents the resultant delayed sequence of states S[1:0] to FSM 145. Successive states S'[1:0] and S[1:0] allow FSM 145 to evaluate transitions between states. As detailed below, state transitions occur in a predictable order when clock signals Clk1 and Clk2 are locked. Out-of-order state transitions indicate phase misalignment and can cumulatively indicate frequency mismatches and lock loss between clock signals Clk1 and Clk2. Register 155 can be programmed to establish a maximum count for counter 150, which FSM 145 employs to adjust the frequency-offset tolerance for issuing a lock signal Lock?.

Lock-detection circuit 100 can be instantiated on an integrated-circuit device (IC) along with circuitry timed to one or both of clock signals Clk1 and Clk2, circuitry that includes e.g. transmitters and receivers to send and receive synchronous data signals from and to the IC and interoperable circuits that communicate among nodes within the IC.

Figure 2:
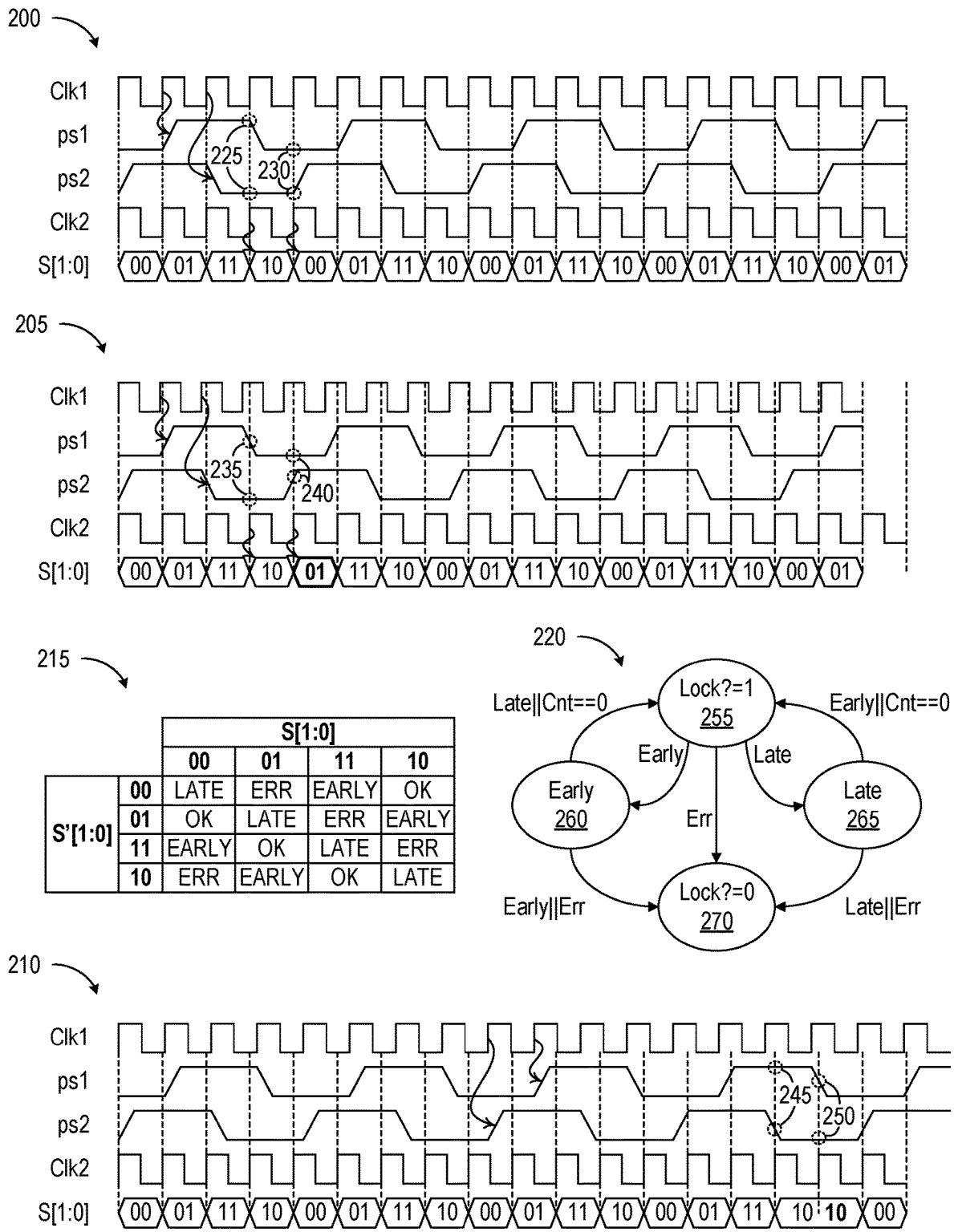
FIG. 2 depicts timing diagrams 200, 205, and 210 illustrating the operation of lock detection circuit 100 of FIG. 1 when edges of clock signal Clk1 are respectively synchronous with, earlier than, and later than those of clock signal Clk2.

FIG. 2 depicts a timing diagram 200 illustrating the operation of lock detection circuit 100 of FIG. 1 when clock signal Clk1 closely matches clock signal Clk2 in phase and frequency; a timing diagram 205 illustrating the operation of lock detection circuit 100 when clock signal Clk1 is of a higher frequency than clock signal Clk2; and a timing diagram 210 illustrating the operation of lock detection circuit 100 when clock signal Clk1 is of a lower frequency than clock signal Clk2. FIG. 2 also depicts a state table 215 and a state diagram 220 illustrating the operation of FSM 145 in accordance with the embodiment of FIG. 1.

Beginning with timing diagram 200, each edge of first clock signal Clk1 stimulates one of flip-flops 115 and 120 to transition high or low to yield quadrature periodic signals ps1 and ps2. Di-bit sampler 125 samples both signals ps1 and ps2 on rising edges of clock signal Clk2 to generate binary pairs, a logic one (zero) for samples of relatively high (low) signals. A pair of sample points 225 illustrates sample timing in which a rising edge of clock signal Clk2 samples a high value for periodic signal ps1 and a low value for periodic signal ps2, yielding a di-bit state value S[1:0]=10. The next pair of sample points 230 illustrates sample timing in which a rising edge of clock signal Clk2 samples low values for both signals ps1 and ps2, yielding a state value S[1:0]=00. Due to the quadrature nature of signals ps1 and ps2, states S[1:0] transition in Gray code, repeating the pattern 00, 01, 11, 10 so long as clock signal Clk1 remains phase and frequency matched with clock signal Clk2. Deviations from Gray-code state transitions on rising edges of clock signal Clk2 indicate phase errors between clock signal Clk1 and Clk2.

Referring next to diagram 205, clock signal Clk1 is of a higher frequency than clock signal Clk2 so edges of clock signal Clk1 arrive ever earlier with respect to those of clock signal Clk2. Transitions S[1:0] generally follow the expected Gray code sequence of the example of diagram 200. However, the phase mismatch between clock signals Clk1 and Clk2 will sometimes produce an error in the expected sequence. A pair of sample points 235 illustrate sample timing in which a rising edge of clock signal Clk2 samples a high value for periodic signal ps1 and a low value for periodic signal ps2, yielding a state value S[1:0]=10. This sample instant occurs during a falling edge of signal ps1, in which case the sampled value could well be a one or a zero. The timings of signals ps1 and ps2 are even earlier relative to clock signal Clk2 during the next pair of sample points 240. The state transition thus changes both bits, from S[1:0]=10 to S[1:0]=01, an error in the Gray code sequence that correlates with a relatively early edge of clock signal Clk1 relative to clock signal Clk2.

State table 215 relates state transitions from a prior state S[1:0] to a current state S'[1:0]. In the example of diagram 205, at sample points 240 state S[1:0] transitions from a prior state S[1:0]=10 to a current state S'[1:0]=01. With reference to table 215, this transition indicates an EARLY condition, which is to say that the edge of clock signal Clk1 occurred early relative to a corresponding transition of clock signal Clk2. In this example, the phase error is due to a frequency mismatch. In practice, phase errors can be due to phase noise, frequency mismatches, or a combination of both.

Turning to diagram 210, clock signal Clk1 is of a lower frequency than clock signal Clk2 so edges of clock signal Clk1 arrive progressively later with respect to those of clock signal Clk2. A pair of sample points 245 illustrate sample timing in which a rising edge of clock signal Clk2 samples high and low values for respective signals ps1 and ps2, yielding a state value S[1:0]=10. The timings of signals ps1 and ps2 are later relative to clock signal Clk2 during the next pair of sample points 250. Neither state variable transitions so that state remains S[1:0]=10, an error in the Gray code sequence. With reference to state table 215, this error indicates a LATE condition, which is to say that the edge of clock signal Clk1 occurred late relative to a corresponding transition of clock signal Clk2.

Table 215 is populated with entries interpreting state transitions for signals S[1:0]. Errors indicative of early and late edges are as noted above. States that increment in Gray code are "OK", and the remaining states designate errors (ERR) and would only be expected to occur in cases of large instantaneous phase jumps.

State diagram 220 illustrates the operation of FSM 145 in accordance with an embodiment that follows state table 215 and is programmable to adjust the permissible frequency offset between clock signals Clk1 and Clk2 before reporting an unlocked condition. FSM 145 remains in an idle state 255 in which signal Lock? is asserted (Lock?=1 for "yes") so long as the state transitions of table 215 are deemed OK. An early indication EARLY instigates a transition to early state 260. Counter 150 begins decrementing from a value stored in register 155, a value that sets a timeframe that determines the frequency sensitivity of lock-detection circuit 100. If a late indication LATE occurs in state 260 or the count reaches zero, the state returns to idle state 255. If a second early indication EARLY occurs before the count reaches zero, the state changes to unlock state 270 and FSM 145 de-asserts lock signal Lock? (Lock?=0 for "no") to signal an unlocked condition.

Alternating between early and late edges indicates edge instability (jitter) rather than frequency mismatch, and successive state errors indicative of early edges can be within frequency offset tolerance if sufficiently spaced in time. Register 155 allows circuit 100 to be programmed such that counter 150 establishes that sufficient spacing. State diagram 220 thus requires either an "error" event ERR or two successive "early" events without an intervening "late" event to issue an error signal Lock?=0.

Returning to state 255, a late indication LATE instigates a transition to late state 265. Counter 150 begins decrementing from the value stored in register 155. If an early indication EARLY occurs in state 265 or the count reaches zero, the state returns to idle state 255. If a second late indication occurs before the count reaches zero, the state changes to unlock state 270 and FSM 145 sets lock signal Lock? to zero to indicate an unlocked condition. State diagram 220 transitions to unlocked state 270 from any other state if a state transition indicates an error ERR.

The examples of diagrams 205 and 210 assume the frequency of clock signal Clk1 differs from that of clock signal Clk2, and these differences cause the edges of clock signal Clk1 to misalign with those of clock signal Clk2. Edge misalignment can also occur due to phase jitter. In some embodiments, FSM 145 can issue measures of jitter that can be used to evaluate and adjust clock performance.

Although the present invention is described in connection with certain specific embodiments for instructional purposes, the present invention is not limited thereto. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. A method for comparing a first clock signal with a second clock signal, the method comprising:
   generating a first periodic signal phase dependent upon the first clock signal;
   generating a second periodic signal phase dependent upon the first clock signal and phase offset from the first periodic signal;
   sampling the first and second periodic signals timed to a sequence of edges of the second clock signal to produce a sequence of states, each state including concurrent samples of the first and second periodic signals, wherein the sequence of states repeats a pattern of the states when the first clock signal is phase aligned with the second clock signal;
   evaluating state transitions in the sequence of states; and
   indicating a phase misalignment between the first clock signal and the second clock signal responsive to a deviation from the pattern of the states.

2. The method of claim 1, wherein each state expresses two bits.

3. The method of claim 1, wherein the repeated pattern is a Gray-code sequence.

4. The method of claim 1, the method further comprising waiting a time from the deviation from the pattern of the states to sense a second deviation from the pattern of the states before indicating the phase misalignment.

5. The method of claim 4, further comprising storing a value indicative of the time.

6. The method of claim 1, wherein the second periodic signal is phase offset from the first periodic signal by ninety degrees.

7. The method of claim 1, further comprising generating the second clock signal.

8. A circuit to compare a first clock signal with a second clock signal, the circuit comprising:
   synchronous elements to generate a first periodic signal phase dependent upon the first clock signal and a second periodic signal phase dependent upon the first clock signal and phase offset from the first periodic signal;

a sampler coupled to the synchronous elements, the sampler to sample the first and second periodic signals timed to a sequence of edges of the second clock signal to produce a sequence of states, each state including concurrent samples of the first and second periodic signals; and a state machine coupled to the sampler to receive the sequence of states and sense a phase error between the first clock signal and the second clock signal responsive to a deviation of the sequence of states from an expected pattern of the states.

9. The circuit of claim 8, wherein each state expresses two bits.

10. The circuit of claim 8, wherein the expected pattern is a Gray-code sequence.

11. The circuit of claim 10, the state machine to wait a time from the sensing of the phase error to sense a second phase error in the expected pattern and issue an error signal responsive to the second phase error.

12. The circuit of claim 11, further comprising a counter to store a count indicative of the time, the counter to time a delay between the phase errors.

13. The circuit of claim 12, further comprising a register coupled to the counter, the register to store a value indicative of the count.

14. The circuit of claim 8, wherein the synchronous elements phase offset the second periodic signal from the first periodic signal by ninety degrees.

15. The circuit of claim 8, wherein the sampler and the state machine are integrated with a clock generator to generate the second clock signal.

16. An integrated circuit comprising:

a quadrature clock generator to generate orthogonal first and second periodic signals both phase dependent upon a first clock signal;

a di-bit sampler coupled to the quadrature clock generator to sample the first and second periodic signals on edges of a second clock signal to produce a sequence of di-bit states, each di-bit state including concurrent samples of the first and second periodic signals; and a state machine coupled to the di-bit sampler to sense transitions between the di-bit states, the state machine to indicate an absence of frequency lock between the first and second clock signals if the transitions between the di-bit states deviate from a Gray-code sequence.

17. The integrated circuit of claim 16, further comprising a counter to count to time a delay from a deviation from the Gray-code sequence, the state machine to issue an error signal responsive to successive deviations from the Gray-code sequence that occur within a reference time.

18. The integrated circuit of claim 17, further comprising a register to store a value indicative of the reference time.

* * * * *